United States Patent
Fulton et al.

(10) Patent No.: US 7,740,010 B2
(45) Date of Patent: *Jun. 22, 2010

(54) SYSTEM AND METHOD OF STOICHIOMETRIC COMBUSTION FOR HYDROGEN FUELED INTERNAL COMBUSTION ENGINES

(75) Inventors: Justin Fulton, Fort Collins, CO (US); Franklin Earl Lynch, Bailey, CO (US)

(73) Assignee: Eden Innovations Ltd., Dublin (IE)

( * ) Notice: Subject to any disclaimer, the term of this patent is extended or adjusted under 35 U.S.C. 154(b) by 436 days.

This patent is subject to a terminal disclaimer.

(21) Appl. No.: 11/871,982

(22) Filed: Oct. 13, 2007

(65) Prior Publication Data

US 2008/0167791 A1 Jul. 10, 2008

Related U.S. Application Data

(63) Continuation-in-part of application No. 11/583,329, filed on Oct. 18, 2006, now Pat. No. 7,281,531.

(51) Int. Cl.
*F02B 43/00* (2006.01)
*F02B 47/08* (2006.01)

(52) U.S. Cl. .......... 123/698; 123/568.11; 123/DIG. 12; 701/108

(58) Field of Classification Search ................. 123/698, 123/568.11, 568.17, 568.19, 1 A, DIG. 12; 701/108, 109
See application file for complete search history.

(56) References Cited

U.S. PATENT DOCUMENTS

| | | |
|---|---|---|
| 6,273,076 B1 | 8/2001 | Beck et al. |
| 6,327,856 B1 | 12/2001 | Iwabushi et al. |
| 6,378,308 B1 | 4/2002 | Pfluger |
| 6,651,623 B1 | 11/2003 | Tang et al. |
| 6,655,324 B2 * | 12/2003 | Cohn et al. ............ 123/568.11 |

(Continued)

OTHER PUBLICATIONS

Advanced Catalyst System, InsightCentral.net, pp. 1-2, Mar. 30, 2006, available on-line http://www.insightcentral.net/encyclopedia/encatalytic.html.

(Continued)

*Primary Examiner*—Hieu T Vo
(74) *Attorney, Agent, or Firm*—Stephen A. Gratton

(57) ABSTRACT

A system includes a hydrogen fueled internal combustion engine, a fuel system configured to provide a flow of hydrogen fuel to the engine, and an exhaust gas recirculation (EGR) system configured to provide a flow of recirculated gas to the engine which includes exhaust gases. The system also includes an engine controller configured to control the fuel system and the EGR system, such that the engine receives a mixture which includes the hydrogen fuel, the ambient air and the recirculated gas in a stoichiometric fuel/air ratio that meets the torque demand on the engine.

A method includes the steps of providing a flow of gaseous hydrogen fuel, a flow of ambient air, and a flow of recirculated exhaust gas to the engine. The method also includes the steps of mixing the flow of recirculated exhaust gas and the flow of ambient air, determining a flow of hydrogen fuel necessary to create a stoichiometric fuel/air ratio, and then regulating the hydrogen fuel flow to control the torque of the engine, minimize throttling work and provide a mixture comprised of the hydrogen fuel, the ambient air and the exhaust gas in a stoichiometric fuel/air ratio.

20 Claims, 10 Drawing Sheets

U.S. PATENT DOCUMENTS

| | | |
|---|---|---|
| 6,779,337 B2 | 8/2004 | Tang et al. |
| 6,823,852 B2 | 11/2004 | Collier, Jr. |
| 7,028,644 B2 * | 4/2006 | Cohn et al. ............ 123/568.11 |
| 7,111,452 B2 | 9/2006 | Miyoshi et al. |
| 7,201,159 B2 | 4/2007 | Veinotte |
| 7,281,531 B1 | 10/2007 | Fulton et al. |
| 2003/0209211 A1 | 11/2003 | Collier, Jr. |
| 2004/0237512 A1 | 12/2004 | Tang et al. |
| 2005/0016507 A1 | 1/2005 | Tamol |
| 2005/0188683 A1 | 9/2005 | Miyoshi et al. |
| 2005/0224045 A1 | 10/2005 | Kuzuyama |
| 2007/0039598 A1 | 2/2007 | Wakayama et al. |

OTHER PUBLICATIONS

"Functionality", Three way catalyst, pp. 1-2, Mar. 30, 2006, available on-line http://www.sanken.osaka-u.ac.jp/-nky15/e-function/e-catal.html.

"Reseach", pp. 1-2, Mar. 30, 2006, available on line http://www.umeme.maine.edu/mick/Classes/Design2003.04/CSC.

"Intercooled Supercharging", Procharger, pp. 1-3, Apr. 17, 2006, available on-line htttp://www.procharger.com/intercooled.shtml.

"Naturally-aspirated engine", Wikipedia, pp. 1-3, Apr. 12, 2006, available on-line, http://en.wikipedia.org/-wiki/Naturally-aspirated.

"Exhaust gas recirculation", Wikipedia, pp. 1-3, Apr. 13, 2006, available on-line, http://en/wikipedia.org/wiki/EGR.

Frank Lynch and Justin Fulton, "7.5 Liter V8 Hydrogen Engine Conversion Manual", Hydrogen Components, Inc., Littleton, CO, Aug. 8, 1996, pp. 1-23.

Steven J. Szwabowski et al., Ford Motor Company, "Ford Hydrogen Engine Powered P2000 Vehicle", 2002, pp. 1-9.

William F. Stockhausen et al., "FordP2000Hydrogen Engine Design and Vehicle Development Program", Ford Motor Company, 2002, pp. 1-9.

Frank Lynch et al., "UCR Hydrogen Fueled Pickup Truck With Constant Volume Injection", Final Report, Hydrogen Consultants, Inc., Littleton, CO Jul. 28, 1994, pp. 1-20.

Frank Lynch and Justin Fulon, "Closed Cycle Submersible Power Systems Phase II", Hydrogen Consultants, Inc., Littleton, CO, Mar. 28, 1995, pp. 1-28.

Robert J. Natkin et al., "Hydrogen IC Engine Boosting Performance and NOx Study", Ford Motor Company, 2002, pp. 1-11.

Jack A. Smith and Gordon J.J. Bartley, Stoichiometric Operation of a Gas Engine Utilizing Synthesis Gas and EGR for Nox Control, ASME Int., New York, NY, 1998, pp. 59-65.

Jonathan Fiene et al., "Development of Hydrogen Engine for a Hybrid Electric Bus", UNLV Center for Energy Research, 2002, pp. 1-8.

Patrick Einewall et al., "Lean Burn Natural Gas Operation vs Stoichiometric Operation with EGR and a Three Way Catalyst", Lund Institute of Technology, 2005, pp. 1-15.

Sebastian Verhelst et al., "A Critical Review of Experimental Research on Hydrogen Fueled SI Engines", Ghent Univeristy, Gent, Belgium, 2006, pp. 1-11.

Ziga Ivanic et al, "Effect of Hydrogen Enhancement on Efficiency and Nox Emissions of Lean and EGR-Diluted Mixtures in a SI Engine", New West Technologies, 2005, pp. 1-2.

International Preliminary Report on Patentability from International Application No. PCT/US2007/081326, Apr. 30. 2009, pp. 1-5.

Office Action from U.S. Appl. No. 11/583,329 (US Patent No. 7,281,531 B1) dated Apr. 17, 2007, pp. 1-13.

\* cited by examiner

SYSTEM AND METHOD OF STOICHIOMETRIC COMBUSTION FOR HYDROGEN FUELED INTERNAL COMBUSTION ENGINES

CROSS REFERENCE TO RELATED APPLICATIONS

This application is a continuation-in-part of Ser. No. 11/583,329 filed Oct. 18, 2006, now U.S. Pat. No. 7,281,531 B1, issued Oct. 16, 2007.

FIELD

This invention relates to systems and methods for controlling hydrogen fueled internal combustion engines.

BACKGROUND

A perfectly balanced air and fuel mixture is commonly known as a 'stoichiometric' mixture. Theoretically, this type of mixture will burn all of the available fuel charge using all of the oxygen available in the air charge. The normalized fuel/air equivalence ratio, designated $\phi$, or phi, is defined as the actual fuel/air ratio divided by the stoichiometric fuel/air ratio for any particular fuel of interest in any consistent set of units (mass ratio, volume ratio, etc.). The fuel/air ratio $\phi$, or phi, is also equivalent to the inverse of the normalized fuel/air ratio known as lambda, or $\lambda$. $\phi$ equals 1 for a stoichiometric fuel/air ratio. When excess fuel is present ($\phi$ greater than one), the mixture is referred to as a 'rich' mixture. On the other hand, when excess air is present ($\phi$ less than one), the mixture is referred to as a 'lean' mixture.

A problem with the use of hydrogen as a motor fuel occurs due to the high flame speed of hydrogen. Hydrogen has an extremely rapid flame speed near stoichiometric fuel/air ratio conditions, which leads to unstable combustion, high oxides of nitrogen (NOx) emissions, and an audible "knocking" sound. The knocking sounds occur even when the combustion is not in a state of true knock from preignition or detonation. For these reasons, most hydrogen-fueled internal combustion engines have only been operated at lean fuel/air ratios.

To slow the hydrogen flame speed for stable combustion, fuel/air equivalence ratios of approximately $0.8\phi$ or less are necessary, and acceptable NOx emissions may require equivalence ratios of $0.5\phi$ or less. The wide flammability range of hydrogen allows operation down to equivalence ratios of about $0.2\phi$. These lean fuel/air ratio conditions limit the specific power output of hydrogen engines, so supercharging or turbo charging is often used to bring the output back up to typical diesel or gasoline power levels.

For the lowest possible exhaust emissions, it is generally desirable to operate spark-ignited internal combustion engines at a stoichiometric fuel/air ratio. This allows the use of a three-way exhaust catalyst, which oxidizes any unburned fuel and carbon monoxide, and reduces almost all of the NOx emissions and any unreacted oxygen. Emissions with a three-way (HC+CO+NOx) catalyst are much less than lean-burn emissions, especially regarding NOx. Current catalyst technology cannot effectively reduce NOx emissions of lean-burn engines. The extremely lean operating conditions possible with hydrogen fuel can dramatically reduce NOx emissions, but only at the expense of specific power and efficiency.

Lean burning engines avoid high NOx emissions by diluting the charge with extra air to reduce peak flame temperature. This dilution also reduces flame speed, which is excessive for near-stoichiometric hydrogen/air mixtures. It is also possible to dilute the charge with exhaust gas. By using exhaust gas recirculation (EGR), with stoichiometric overall fuel/air ratio, the dilution effects are similar to air dilution. The flame speed and combustion temperatures are reduced to stabilize the combustion and further decrease NOx formation. The EGR diluted, stoichiometric exhaust lacks excess oxygen to interfere with the NOx-reduction activity of the three-way catalysts, and less oxygen is available in the combustion chamber for NOx formation, relative to lean-burn air dilution. Any unburned hydrogen is a powerful reducing agent for efficient catalysis of nitrogen oxides at low exhaust temperatures.

In a typical spark ignited engine, there are efficiency losses due to throttling, known as pumping work. A throttle plate is used to control airflow through the intake manifold into the combustion chamber. It is advantageous to keep the pressure drop across the throttle to a minimum, whenever possible, to avoid efficiency losses due to pumping work. However, there are problems associated with the operation of lean-burn hydrogen engines at wide open throttle. At very low loads, throttling is typically needed to control the combustion stability of hydrogen. This also limits the unburned hydrogen emissions. At medium to high loads, the power output of a lean-burn hydrogen engine may be controlled by varying the fuel/air ratio at wide open throttle, but a reasonable power output for a given engine size requires fuel/air ratios rich enough to substantially increase the NOx emissions.

The methods of EGR can be broadly classified as either 'internal' or 'external'. By closing the exhaust valve early or leaving it open through the intake valve opening and the beginning of the intake stroke, exhaust gases can either be trapped or drawn back into the engine cylinder for internal EGR. With a naturally aspirated hydrogen engine, a fixed-timing cam with delayed exhaust valve closing can be designed to deliver an appropriate EGR percentage at wide open throttle. At lower loads, as the air intake throttle is closed, the intake manifold pressure is reduced relative to the exhaust manifold pressure. This reduces power by both throttling the intake air charge and by drawing in additional EGR. However, the amount of throttling at a given part-load condition is greatly reduced, which also reduces pumping losses and improves part-load efficiency. Internal EGR may also be controlled with variable valve timing control, common on many modern gasoline engines. With variable valve timing, the EGR percentage can be directly controlled between the exhaust valve closing and intake valve opening times, and no external throttling is necessary.

Internal EGR is hot EGR, which may increase the likelihood of preignition and/or intake backfiring. Hydrogen fuel has a fairly high autoignition temperature, but the ignition energy requirement is extremely low. Therefore, hot exhaust gases, particles, or residual combustion reactions may ignite the incoming air/hydrogen mixture. These risks can be mitigated by combustion chamber design details and good lubrication oil control. In addition, the simplicity of the fixed-cam-timing, internal EGR system may outweigh the small efficiency losses resulting from slight throttling, compared to almost completely unthrottled, variable valve timing or external EGR systems. On the other hand, designing a fixed-timing cam for turbocharged engines may be difficult, due to the uncertain relationship between the intake and exhaust manifold pressures at various operating conditions. Internal EGR with fixed cam timing may also require delayed intake valve opening and near-zero valve timing overlap for supercharged engines, since the intake pressure is almost always greater than the exhaust pressure. In this case, additional part load throttling may also be required.

In contrast to internal EGR control systems, external EGR is plumbed from the exhaust manifold, or further downstream, back to the intake manifold, or further upstream, through a separate metering valve or flow control device. This external EGR flow can be further categorized as 'hot' or 'cooled'. For conventional gasoline engines utilizing hot EGR, the EGR flow is relatively small, so the passive cooling provided by the EGR plumbing and mixing with cooler intake air is sufficient to avoid any problems due to excessive intake temperature. However, modern diesel engines utilizing very high EGR flow rates use a dedicated EGR heat exchanger, cooled by the engine coolant loop. Hydrogen engines with EGR for torque control can have EGR flow rates even higher than typical diesels, and they can utilize the EGR coolers developed for similar or somewhat larger diesel engines.

The foregoing examples of the related art and limitations related therewith are intended to be illustrative and not exclusive. Other limitations of the related art will become apparent to those of skill in the art upon a reading of the specification and a study of the drawings.

SUMMARY

A system and a method are provided for operating hydrogen fueled engines, which control engine torque, minimize throttling work, and achieve stoichiometric combustion. The system includes a hydrogen fueled internal combustion engine, a fuel system configured to provide a flow of hydrogen fuel to the engine, and an exhaust gas recirculation (EGR) system configured to provide a flow of recirculated gas to the engine which includes exhaust gases. The system also includes either a throttle (for internal, fixed cam timing EGR), variable valve timing (for internal, unthrottled EGR), or an air & EGR control valve (for external EGR) configured to control the recirculated gas flow and ambient air flow to the engine. The system also includes an engine controller configured to control the fuel system, the EGR system and/or the air and EGR control valve, such that the engine receives a mixture which includes the hydrogen fuel, the ambient air and the recirculated gas in a stoichiometric fuel/air ratio. The system also includes one or more sensors configured to provide engine operating data to the controller, and a three-way exhaust catalyst configured to remove emission gases from the exhaust gases.

The system overcomes the rapid flame speed and unstable combustion of hydrogen at stoichiometric fuel/air ratios by diluting the fuel/air charge with recycled exhaust. Typically, the exhaust gas in a lean burning system will bring along extra oxygen that interferes with the three-way catalyst, and increases NOx production. By using EGR with a stoichiometric fuel/air mixture, there is very little, if any, excess oxygen in a stoichiometric exhaust to interfere with the NOx-reduction activity of the three-way catalyst. In addition, less oxygen is available for NOx production in the combustion chamber, and flame speed and combustion temperature are reduced to stabilize the combustion and further reduce NOx formation.

Utilizing fixed cam timing and internal EGR with hydrogen fuel, the relative extent of throttling for torque control is greatly reduced, which reduces pumping losses at part load conditions. In the variable valve timing or external EGR systems, the hydrogen engine does not require the use of any throttling to control intake air flow at various loads, which provides dramatic improvements in part-load fuel efficiency. At all but the lightest loads, engine torque can be controlled exclusively by the air to EGR ratio with no throttling. At light loads, incomplete combustion may justify the use of some throttling to reduce fuel consumption. In addition, the engine operates on an overall stoichiometric fuel/air ratio, providing near-zero emissions from the exhaust catalyst and relatively high specific power.

Because the engine is operated at stoichiometric conditions, the recirculated exhaust gas will contain substantially zero oxygen. In sufficient quantity, this EGR prevents knocking, unstable combustion and excessive NOx emissions. In addition, applying a three-way catalyst to zero oxygen exhaust from the engine produces near-zero emissions. Further, the use of variable EGR with stoichiometric hydrogen, along with the three-way catalyst, overcomes the trade-off between power density and emissions that is typical for traditional lean-burn hydrogen operation. Supercharging or turbocharging can also be utilized with the hydrogen powered engine to provide improved specific power output. Turbocharging may also produce further efficiency improvements.

The method can include the steps of providing a flow of gaseous hydrogen fuel, a flow of ambient air, and a flow of recirculated exhaust gas to the engine (internally or externally supplied). The method can also include the steps of mixing the flow of recirculated exhaust gas and the flow of ambient air, determining a flow of hydrogen fuel necessary to create a stoichiometric fuel/air ratio, and then regulating the hydrogen fuel flow to control the torque of the engine, minimize throttling work and provide a mixture comprised of the hydrogen fuel, the ambient air and the exhaust gas in a stoichiometric fuel/air ratio. The method can also include the step of burning substantially all of the hydrogen fuel in the mixture provided to the engine.

Stated differently, the method can include the steps of: providing flows of hydrogen fuel, air and recirculated exhaust gas to the engine; operating the engine with a mixture comprised of the hydrogen fuel, the air and the recirculated exhaust gas; determining the flows of the hydrogen fuel, the air and the recirculated exhaust gas necessary to provide a stoichiometric fuel/air ratio of the mixture during the operating step; and regulating the flows during the operating step to reduce throttling and control torque at engine loads and corresponding air/EGR ratios above a predetermined amount. At very light loads the overall efficiency improves with some throttling and reduced dilution by recirculated exhaust gas. The lower limit for stable combustion is approximately 10% hydrogen by volume in stoichiometric air plus recirculated exhaust gas at a total pressure reduced by throttling.

DETAILED DESCRIPTION

Figure 1:
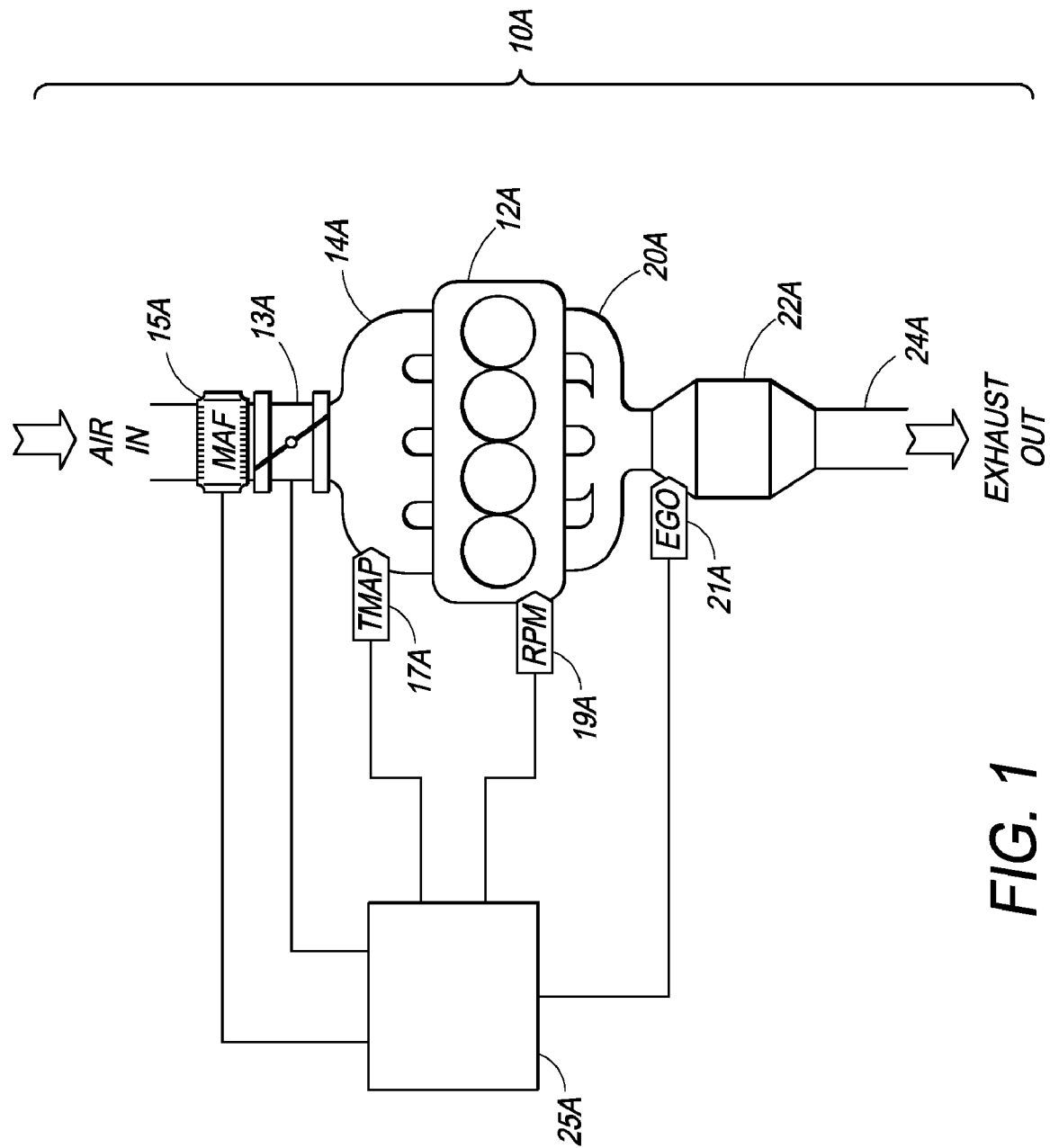
FIG. 1 is a schematic diagram of an internal EGR system that includes a naturally-aspirated engine with fixed cam timing and delayed exhaust valve closing.

Referring to FIG. 1, an internal EGR system 10A powered by hydrogen fuel is illustrated. The system 10A includes an internal combustion engine 12A configured to burn the hydrogen fuel. In addition, the engine 12A is naturally aspirated, has fixed cam timing and is configured for internal EGR. The system 10A also includes an intake manifold 14A in flow communication with the engine 12A configured to receive the ambient air. The system 10A also includes a throttle 13A configured to throttle the engine 12A. As used herein the term "throttling" refers to the variable restriction of intake manifold air flow or fuel/air mixture to control the torque produced by the engine 12A. The throttle 13A also controls the EGR percentage indirectly, by varying the pressure difference between the intake manifold 14A and the exhaust manifold 20A.

The system 10A (FIG. 1) includes an exhaust manifold 20A in flow communication with the engine 10A, and an exhaust catalyst 22A, in flow communication with the exhaust manifold 20A. After leaving the engine 12A via the exhaust manifold 20A, the exhaust gas enters the exhaust catalyst 22A. The exhaust catalyst 22A comprises a three-way catalyst typically found in automotive applications, which is configured to reduce carbon monoxide, hydrocarbon emissions and NOx emissions. After the exhaust gas is processed in the exhaust catalyst 22A, it exits the system 10A via an exhaust outlet 24A.

The system 10A (FIG. 1) also includes a mass airflow sensor (MAF) 15A configured to measure the mass flow of air into the throttle 13A. The system 10A also includes a temperature and manifold absolute pressure (TMAP) sensor 17A configured to measure the temperature and absolute pressure of the total air and EGR flow into the intake manifold 20A. The system 10A also includes an (RPM) sensor 19A configured to measure the speed of the engine 12A in revolutions per minute. The system 10A also includes an exhaust gas oxygen (EGO) sensor 21A configured to measure the oxygen content of the exhaust gas exiting the exhaust manifold 20A. Each of the sensors (15A, 17A, 19A, 21A) and the throttle 13A as well, is in signal communication with an engine controller 25A. As will be further explained, using input from the sensors (15A, 17A, 19A, 21A), the flows of air, EGR and hydrogen fuel to the engine 12A are controlled to control engine torque, minimize throttling work and provide a mixture that includes the hydrogen fuel, the ambient air and the exhaust gas in a stoichiometric fuel/air ratio. The sensors also provide the data necessary for calculating the EGR percentage, which may be further used for other engine control functions, such as ignition timing.

Figure 2:
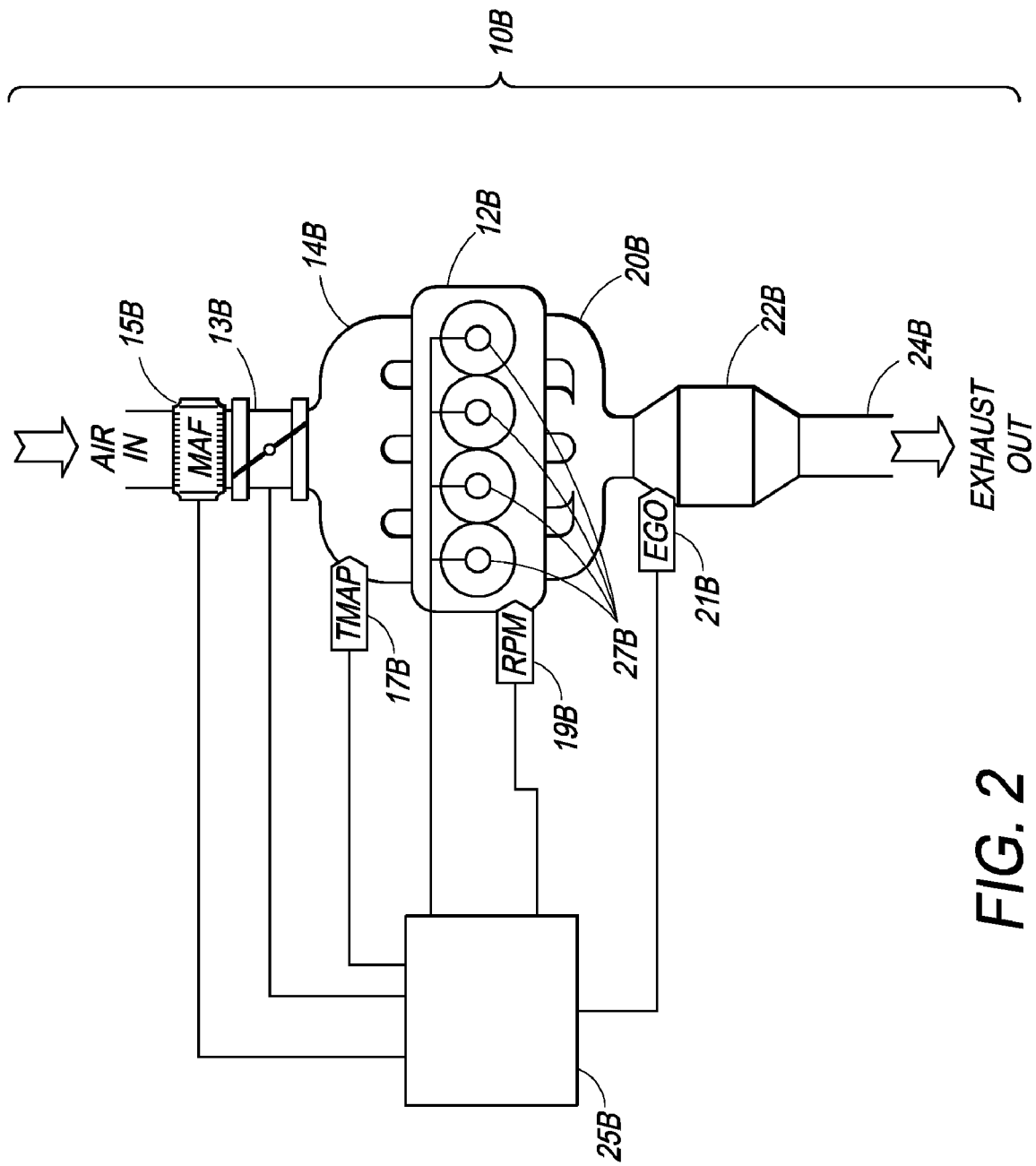
FIG. 2 is a schematic diagram of an internal EGR system that includes a naturally-aspirated engine with variable valve timing.

Referring to FIG. 2, an internal EGR system 10B powered by hydrogen fuel is illustrated. The system 10B includes an internal combustion engine 12B configured to burn the hydrogen fuel. In addition, the engine 12B is naturally aspirated, has variable valve timing mechanism 27B for adjusting valve timing, and is configured for internal EGR. The system 10B also includes a throttle 13B and an intake manifold 14B in flow communication with the engine 12B configured to receive the ambient air. The system 10B also includes an exhaust manifold 20B in flow communication with the engine 10B, and an exhaust catalyst 22B, in flow communication with the exhaust manifold 20B.

The system 10B (FIG. 2) also includes a mass airflow sensor (MAF) 15B configured to measure the mass flow of air into the intake manifold 14B. The system 10B also includes a temperature and manifold absolute pressure (TMAP) sensor 17B configured to measure the temperature and absolute pressure of the air flow into the intake manifold 20B. The system 10B also includes an (RPM) sensor 19B configured to measure the speed of the engine 12B in revolutions per minute. The system 10B also includes an exhaust gas oxygen (EGO) sensor 21B configured to measure the oxygen content of the exhaust gas exiting the exhaust manifold 20B. Each of the sensors (15B, 17B, 19B, 21B), and the valve timing mechanism 27B as well, is in signal communication with an engine controller 25B. As will be further explained, using input from the sensors (15B, 17B, 19B, 21B) the flow of air, EGR and hydrogen fuel to the engine 12B is controlled to control torque, minimize throttling work and provide a mixture that includes the hydrogen fuel, the ambient air and the exhaust gas in a stoichiometric fuel/air ratio. The sensors also provide the data necessary for calculating the EGR percentage, which may be further used for other engine control functions, such as ignition timing.

Figure 3:
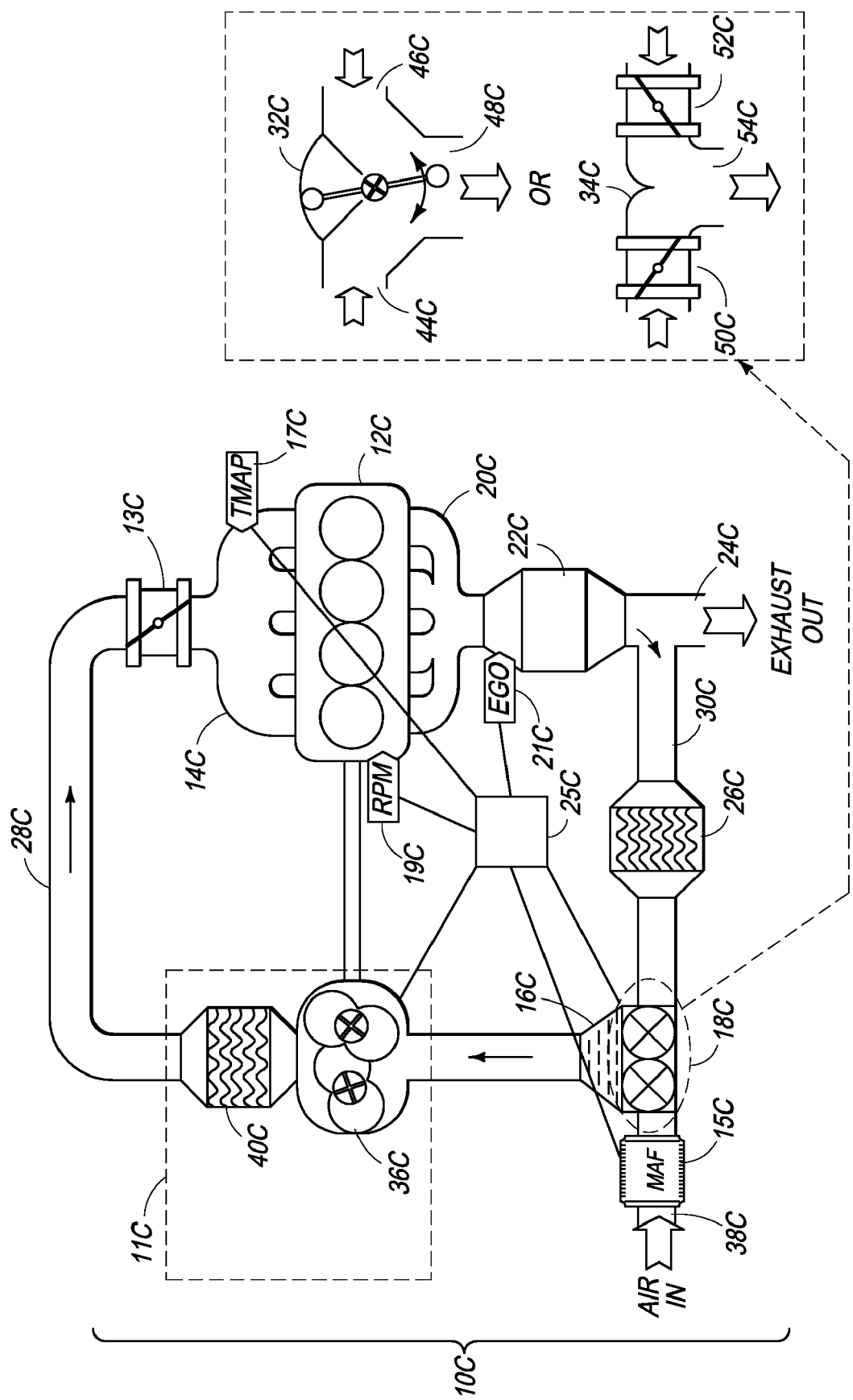
FIG. 3 is a schematic diagram of an external EGR system that includes a naturally-aspirated or mechanically supercharged engine.

Referring to FIG. 3, an external EGR system 10C powered by hydrogen fuel is illustrated. The system 10C includes an internal combustion engine 12C configured to burn the hydrogen fuel. The engine 12C can be naturally aspirated, or can optionally include a supercharging system 11C.

The system 10C (FIG. 3) also includes a throttle 13C and an intake manifold 14C in flow communication with the engine 12C, an exhaust manifold 20C in flow communication with the engine 12C, and an exhaust catalyst 22C in flow communication with the exhaust manifold 20C. The system 10C also includes a mass airflow sensor (MAF) 15C configured to measure the mass flow of air into the air and EGR flow control valve 18C. The system 10C also includes a temperature and manifold absolute pressure (TMAP) sensor 17C configured to measure the temperature and absolute pressure of the air flow into the intake manifold 20C. The system 10C also includes an (RPM) sensor 19C configured to measure the speed of the engine 12C in revolutions per minute. The system 10C also includes an exhaust gas oxygen (EGO) sensor 21C configured to measure the oxygen content of the exhaust gas exiting the exhaust manifold 20C. Each of the sensors (15C, 17C, 19C, 21C), is in signal communication with an engine controller 25C.

The system 10C (FIG. 3) also includes an air & EGR flow control valve 18C in signal communication with controller 25C and in flow communication with an air & EGR mixer 16C. In the naturally aspirated embodiment the output from the air and EGR mixer 16C feeds directly into the intake manifold 14C. In the supercharged embodiment the output from the air and EGR mixer 16C feeds into a supercharger 36C in flow communication with the intake manifold 14C. The air & EGR flow control valve 18C is connected to an ambient air inlet 38C, which provides the ambient air, and to a recirculated gas conduit 30C which provides the recirculated exhaust gas. The air & EGR mixer 16C is configured to mix the ambient air and the recirculated exhaust gas (EGR). The exhaust gas from the engine 12C is processed in the exhaust catalyst 22C, and then either exits the system 10C via an exhaust outlet 24C, or is recirculated back through the recirculated gas conduit 30C to the air & EGR flow control valve 18C.

Hot recirculated exhaust gas increases the likelihood of preignition and/or intake backfiring. Even though hydrogen fuel has a fairly high autoignition temperature, the ignition energy requirement is extremely low. Any hot exhaust gases, particles, or residual combustion reactants may ignite the incoming air/hydrogen mixture. To avoid any issues with preignition, backfire, or excessive intake temperatures, the system 10C (FIG. 3) can also include an EGR cooler/condensate trap 26C in the recirculated gas conduit 30C configured to cool the recirculated exhaust gas prior to entry into the air & EGR flow control valve 18C. The EGR cooler/condensate trap 26C can be similar to an air-to-water intercooler, but is designed for higher temperatures (up to 800° C.) and potentially corrosive exhaust condensation.

The right side of FIG. 3 illustrates two different embodiments of the air & EGR flow control valve 18C. In a first embodiment (upper), the air & EGR flow control valve 18C comprises a proportional control valve 32C that proportions the air and EGR flow areas. In a second embodiment (lower), the air & EGR flow control valve 18C comprises a tandem air/EGR valve 34C. With the tandem air/EGR valve 34C, the throttle 13C is not required. Either valve (proportional control valve 32C or tandem air/EGR valve 34C) reduces throttling efficiency losses by minimizing the pumping work due to overall intake flow restriction.

The proportional control valve 32C (FIG. 3) operates by proportioning the ratio of air and recirculated exhaust gas entering the valve 32C. The proportional control valve 32C includes a variable area air duct 44C for air, and an exhaust gas duct 46C for recirculated exhaust gas. In a naturally aspirated system, the air duct 44C receives a flow of ambient air from the atmosphere surrounding the system 10C. Optionally, with the supercharging system 10C the air duct 44C can be in flow communication with the supercharger 36C. In both the naturally aspirated and supercharged configurations of the system 10C (FIG. 3), the exhaust gas duct 46C of the proportional control valve 32C is in flow communication with the EGR cooler/condensate trap 26C via the recirculated gas conduit 30C. Both ducts 44C and 46C are in flow communication with an exit duct 48C, which is in flow communication with the air & EGR mixer 16C. By proportioning the amount of air and recirculated exhaust gas flowing through the proportional control valve 32C, the ratio of air to recirculated exhaust gas entering the air & EGR mixer 16C can be controlled.

The tandem air/EGR valve 34C (FIG. 3) can be utilized in place of the proportional control valve 32C. The tandem air/EGR valve 34C includes an air valve 50C and a recirculated exhaust gas valve 52C, both in flow communication with an exit duct 54C. In the naturally aspirated embodiment of the system 10C, the air valve 50C receives a flow of ambient air from the atmosphere surrounding the system 10C. Optionally, in the supercharged embodiment of the system 10C, the air valve 50C can be in flow communication with the supercharger 36C. In both the naturally aspirated and supercharged embodiments of the system 10C, the recirculated exhaust gas valve 52C is in flow communication with the EGR cooler/condensate trap 26C via the recirculated gas conduit 30C. The air valve 50C and the recirculated exhaust gas valve 52C are opened or closed to control the ratio of air to recirculated exhaust gas leaving the exit duct 54C.

In the supercharged embodiment of the system 10C (FIG. 3), it may be beneficial to cool the outlet from the supercharger 36C. Accordingly, the system 10C can optionally include a charge intercooler/condensate trap 40C in flow communication with the supercharger 36C and with the inlet manifold 14C. Once the charge is cooled, it leaves the charge intercooler/condensate trap 40C through the intake conduit 28C and enters the intake manifold 14C In either the naturally aspirated embodiment or the supercharged embodiment of the system 10C (FIG. 3), the EGR flow can be controlled using either the proportional control valve 32C, or the tandem air/EGR valve 34C, with a separate air valve 50C and recirculated exhaust valve 52C. Either valve 32C or 34C reduces throttling efficiency losses by minimizing the pumping work due to the overall intake flow restriction. In addition, using input from the sensors (15C, 17C, 19C, 21C), the flow of air, EGR and hydrogen fuel to the engine 12C can be controlled to achieve a stoichiometric air fuel ratio at the desired torque. The sensors (15C, 17C, 19C, 21C) also provide the data necessary for calculating the EGR percentage, which may be further used for other engine control functions, such as ignition timing.

With any external EGR system, condensation of the cooled exhaust will occur, and potential issues with intake of the liquid water must be considered in the system design. Even if a system has condensation mitigation controls, liquid water will still occur during a cold start or possibly during transient conditions. Water may cause corrosion problems, especially with acidic compounds formed by absorbed exhaust gases. Water vapor condensing and vaporizing from reservoirs and low spots in the plumbing causes variable and unmeasured changes in the engine intake flow and composition, which can lead to engine control errors. In the extreme case, the intake of a sudden, relatively large amount of water could even hydraulically seize the engine.

In addition to the selection of compatible materials for engine or plumbing parts in contact with EGR condensation, there are several common methods for managing the mitigation and collection issues of intake water from condensed exhaust. By keeping the normal operating temperature of the EGR cooler and charge intercooler high enough, condensation will only occur during cold-start and warm-up conditions. The mole fraction of water vapor in stoichiometric hydrogen exhaust is about 35%. At atmospheric pressure, this exhaust can be cooled down to 73° C. without condensation; at a higher boost condition of 300 kPa, the EGR must be kept above 101° C. to avoid condensation. Likewise, the ambient intake air to the supercharger or the turbocharger may be saturated at 100% humidity. After pressurizing with the supercharger or the turbocharger and cooling in the intercooler, condensation may result—and EGR will add to this potential for condensation. For example, at a worst-case condition of 100% humidity at 40° C. ambient, 300 kPa boost pressure, and 75% EGR, the intercooler outlet must be kept above 95° C. to avoid condensation.

By measuring pressure at the EGR cooler outlet, the minimum temperature to avoid condensation can be calculated by the engine controller from the combustion stoichiometry and a table of temperature vs. water vapor pressure. Then, the EGR can be actively controlled at or above this condensation temperature by controlling the flow of coolant or bypassing the coolant or EGR around the cooler. Likewise, by measuring the ambient air temperature and relative humidity (or by measuring ambient air temperature and assuming 100% humidity), and by measuring pressure at the intercooler outlet, the temperature of the mixed intake air and EGR can be controlled above its calculated 'dew point'. It is also possible to simply limit the amount of EGR based on the actual outlet temperatures and pressures of the EGR cooler and intercooler—in this case, intake throttling may be necessary at low temperatures and light loads. For the cases above, where condensation is avoided during normal operation, the small or intermittent condensation may be controlled with a simple drain hole at the low point of the plumbing immediately after the EGR cooler and/or the supercharger or turbocharger air charge intercooler. If the intake plumbing does not coalesce enough of the condensation at start-up, additional baffles, elbows, inertial mist separation devices, and/or mist impingement surfaces may be necessary to avoid issues, like spark plug fouling with water, and corrosion until the engine warms to normal operating temperature.

The opposite approach to managing EGR condensation is to try to condense as much water as possible during normal operation. This strategy adds complexity to the plumbing, since mechanical water droplet separators (like cyclonic 'knock-out drums'), float drains, and heaters and insulation to avoid water freezing in cold environments are likely to be necessary. The engine control algorithms may also become more complex due to measuring and compensating for a variable water vapor content of the intake charge. The major benefit, however, is increased power density due to cooling the intake charge as much as possible.

In addition, there is a subtle efficiency advantage to removing water vapor from the intake charge. The ratio of specific heats of diatomic molecules (like nitrogen or oxygen) is more favorable than tri-atomic molecules (like water or carbon dioxide) for the theoretical Carnot efficiency of the engine. For example, with 75% EGR at a boost pressure of 300 kPa, comparing an intake charge saturated with water vapor at 50° C. (most of the EGR water vapor condensed and drained) vs. an intake charge saturated with water vapor at 95° C. (no EGR condensation) results in a theoretical efficiency improvement of 3.67%. For this example, an engine with 43.0% brake thermal efficiency could be improved to 44.6% brake thermal efficiency by the condensing and draining of 89% of the water in the EGR.

Figure 4:
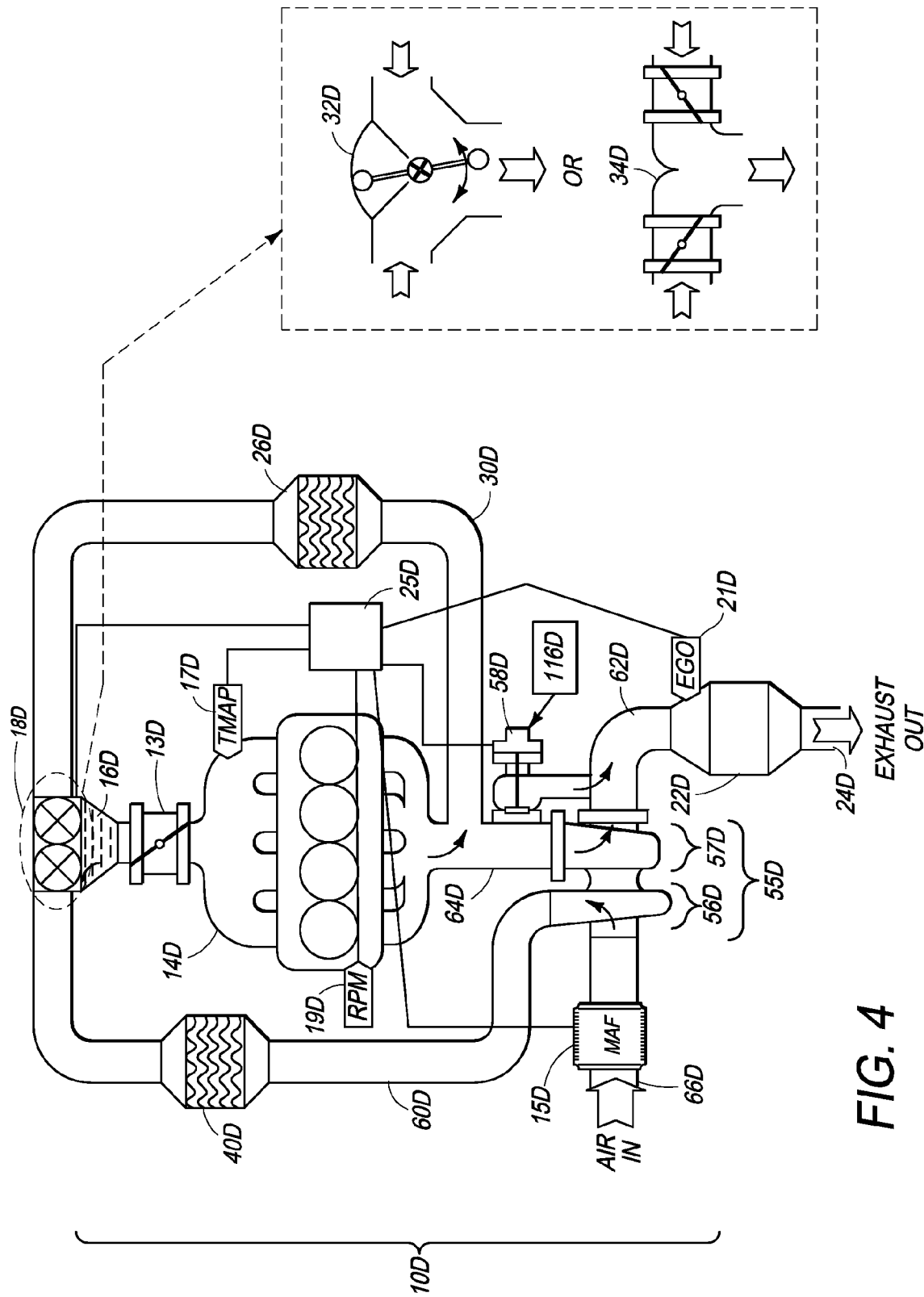
FIG. 4 is a diagram of a high pressure external EGR system that includes a turbocharged engine.

Referring to FIG. 4, an alternate embodiment system 10D containing a turbocharging system is illustrated. The system 10D includes an engine 12D, a throttle 13D, an intake manifold 14D, an air & EGR Mixer 16D, an air & EGR flow control valve 18D, an exhaust manifold 20D, an EGR cooler/condensate trap 26D, and a controller 25D, all of which are constructed substantially as previously described for the system 10C (FIG. 3). The system 10D can also include a proportional control valve 32D or a tandem air/EGR valve 34D to control flow into the air & EGR mixer 16D, also as previously described for the system 10C (FIG. 3). With the tandem air/EGR valve 34D, the throttle 13D is not required. The system 10D also includes a turbocharger 55D having a turbocharger compressor 56D and a turbocharger turbine 57D.

The system 10D (FIG. 4) also includes a mass airflow sensor (MAF) 15D in signal communication with the controller 25D configured to measure the mass flow of air into the turbocharger compressor 56D. The system 10D also includes a temperature and manifold absolute pressure (TMAP) sensor 17D in signal communication with the controller 25D configured to measure the temperature and absolute pressure of the air flow into the intake manifold 20D. The system 10D also includes an (RPM) sensor 19D in signal communication with the controller 25D configured to measure the speed of the engine 12D in revolutions per minute. The system 10D also includes an exhaust gas oxygen (EGO) sensor 21D in signal communication with the controller 25D configured to measure the oxygen content of the exhaust gas flowing through the conduit 62D.

Figure 6:
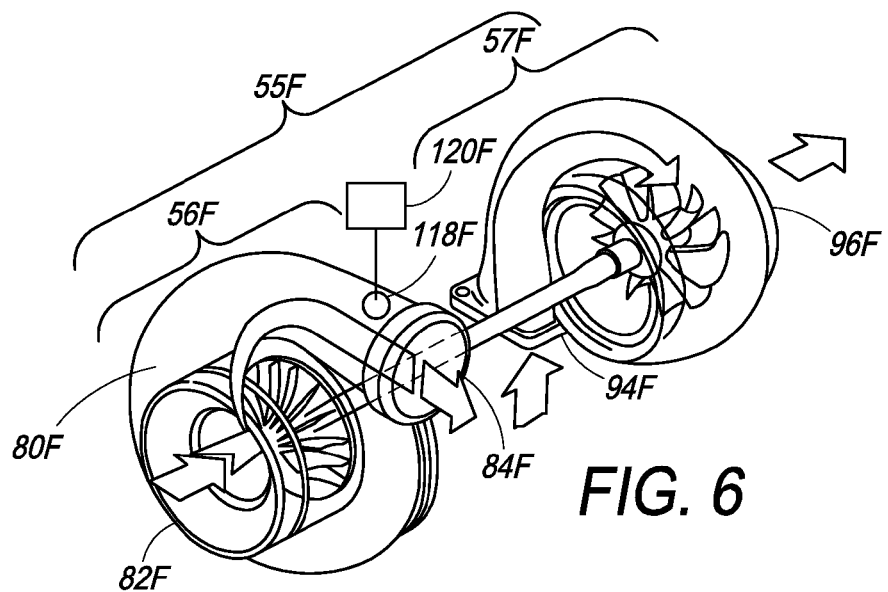
FIG. 6 is a schematic diagram of the turbocharger used in the systems of FIG. 4 and FIG. 5.

In the system 10D the exhaust gas flows from the exhaust manifold 20D of the engine 14D into the turbocharger turbine 57D. Some details of the turbocharger 55D not shown in FIG. 4, are shown in FIG. 6. As shown in FIG. 4, the exhaust manifold 20D and the turbocharger 55D are in flow communication via a conduit 64D. The turbocharger 55D includes an air intake 66D, which takes in ambient air from the atmosphere. As shown in FIG. 6, the exhaust gas from the conduit 64D (FIG. 4) flows through an exhaust gas inlet 94F (FIG. 6) into a turbine 57F (FIG. 6) of the turbocharger 55F (FIG. 6). As the wheel in the turbine 57F (FIG. 6) rotates, it powers a wheel in the compressor 56F (FIG. 6), which compresses air entering the turbocharger compressor 56F (FIG. 6) through the air intake 66D (FIG. 4). The turbocharger compressor 56D (FIG. 4) is in flow communication with the air & EGR flow control valve 18D via a conduit 60D. In addition, the system 10D can optionally include an air charge intercooler/condensate trap 40D in flow communication with the turbocharger compressor 56D, and with the air and EGR flow control valve 18D and with the air & EGR Mixer 16D.

The system 10D (FIG. 4) can also include a wastegate 58D in signal communication with the intake manifold pressure or a controller 25D, and in flow communication with the exhaust manifold 20D via the conduit 64D. The wastegate 58D is configured for air boost pressure control and possibly for additional air/EGR ratio control. The wastegate 58D can open or close to change the speed of the turbine 57D in the turbocharger 55D. Excess exhaust gas is vented through the wastegate 58D, which is in flow communication with the exhaust conduit 62D. After exhaust gas is processed in the exhaust catalyst 22D, it leaves the system 10B via the exhaust outlet 24D. Exhaust gas is recirculated back to the air & EGR flow control valve 18D and mixed with the air from the turbocharger compressor 56D.

Optionally, the wastegate 58D (FIG. 4) can be replaced by a variable geometry actuator 116D in signal communication with the intake manifold pressure or the controller 25D. The variable geometry actuator 116D is configured to change the cross sectional flow area for the exhaust gas entering the turbine 57D. The variable geometry actuator 116D opens or closes depending on the desired intake pressure provided by the turbocharger compressor 56D. By changing the exhaust gas cross sectional flow area at the entrance of the turbine 57D, the speed of the wheel in the turbine 57D is changed, which also changes the speed of the wheel in the compressor 56D, and thus the amount of ambient air and pressure delivered to the engine 12D.

Referring to FIG. 6, additional details of the turbocharger 55F are illustrated. The turbocharger 55F includes the compressor 56F having an air inlet 82F, a compressor housing 80F, and a compressor air discharge 84F in flow communication with the compressor housing 80F. The turbocharger 55F also includes the turbine 57F, which includes an exhaust gas inlet 94F and an exhaust gas outlet 96F. The compressor air inlet 82F receives filtered ambient air from the atmosphere. The turbocharger compressor 56F is in flow communication with the air & EGR flow control valve 18D (FIG. 4), and provides compressed air to the conduit 60D (FIG. 4) via the compressor air discharge 84F. The turbine 57F is also in flow communication with the exhaust manifold via the conduit 64D (FIG. 4), and receives a supply of exhaust gas, which causes the wheel in the turbine 57F to rotate. Once the exhaust gas passes through the turbine 57F, it is discharged through the exhaust gas outlet 96F.

The wastegate 58D (FIG. 4) controls the flow of exhaust gas entering the turbine 57F (FIG. 6). As less exhaust gas enters the turbine 57F (FIG. 6), the speed of the wheel in the turbine 57F (FIG. 6) decreases. The wastegate 58D (FIG. 4) senses the boost pressure provided by the turbocharger compressor 56D (FIG. 4). If the pressure gets too high, it could be an indicator that the turbine and compressor wheels are spinning too quickly, so the wastegate 58D bypasses some of the exhaust gas allowing the turbine and compressor wheels to slow down.

The turbocharger 55F (FIG. 6) can also include a pressure sensor 118F (FIG. 6) in signal communication with the controller 25D (FIG. 4) configured to sense the boost pressure downstream of the air discharge 84F (FIG. 6). The pressure sensor 118F (FIG. 6) is also in signal communication with the wastegate 58D (FIG. 4). The pressure sensor 118F (FIG. 6) can control the wastegate 58D (FIG. 4) using either mechanical or electronically controlled components. The pressure sensor 118F (FIG. 6) can optionally include, or be in signal communication with, a processor 120F (FIG. 6) configured to determine whether the boost pressure should be raised or lowered to match the conditions of the engine 12D (FIG. 4). Optionally, the processor 120F (FIG. 6) can also be in signal communication with the controller 25D (FIG. 4) for controlling the wastegate 58D (FIG. 4) based upon the current needs of the engine 12D (FIG. 4), as well as on the boost pressure provided by the compressor 56F (FIG. 6).

The pressure sensor 118F (FIG. 6) can also be in signal communication with the controller 25D (FIG. 4). The controller 25D (FIG. 4) makes determinations on whether the boost pressure needs to be adjusted to meet the needs of the engine, and the wastegate 58D (FIG. 4) would adjust accordingly based upon the control signals sent by the controller 25D.

Optionally, the pressure sensor 118F (FIG. 6) can be in signal communication with the variable geometry actuator 116D (FIG. 4). Based upon readings from the pressure sensor 118F (FIG. 6), the variable geometry actuator 116D (FIG. 4) would open or close accordingly to match the necessary conditions of the engine 12D (FIG. 4). The pressure sensor 118F (FIG. 6) could also be in signal communication with the controller 25D (FIG. 4), which could control the variable geometry actuator 116D (FIG. 4). For example, the controller 25D could determine whether the position of the variable geometry actuator 116D (FIG. 4) needs to be changed, and the send control signals to effect the changes.

Figure 5:
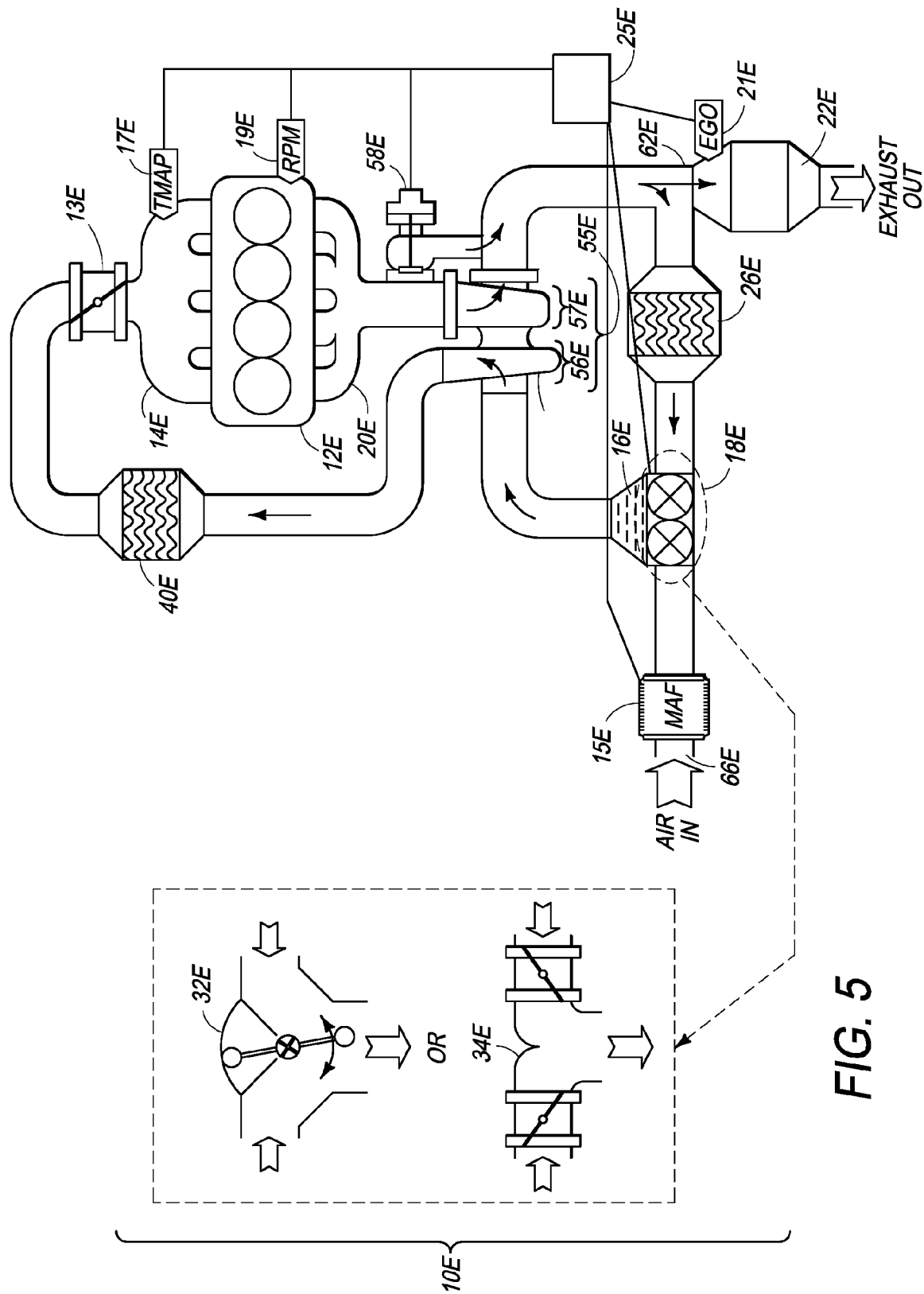
FIG. 5 is a diagram of a low pressure external EGR system that includes a turbocharged engine.

Referring to FIG. 5, an alternate embodiment system 10E containing a turbocharging system is illustrated. The system 10E is substantially similar to the system 10D (FIG. 4), but the air and recirculated gas are mixed at low pressure prior to entering the turbocharger compressor 56E. The system 10E includes an engine 12E, a throttle 13E, an intake manifold 14E, an air & EGR Mixer 16E, an air & EGR flow control valve 18E, an exhaust manifold 20E, an EGR cooler/condensate trap 26E, an exhaust catalyst 22E, an air charge cooler/condensate trap 40E and a controller 25E, all of which are constructed substantially as previously described for the system 10D (FIG. 4). The system 10E can also include a proportional control valve 32E or a tandem air/EGR valve 34E to control flow into the air & EGR mixer 16E, also as previously described for the system 10D (FIG. 4). With the tandem air/EGR valve 34E, the throttle 13E is not required. The system 10E also includes a turbocharger 55E having a turbocharger compressor 56E and a turbocharger turbine 57E.

The system 10E (FIG. 5) also includes a mass airflow sensor (MAF) 15E in signal communication with the controller 25E configured to measure the mass flow of air into the turbocharger compressor 56E. The system 10E also includes a temperature and manifold absolute pressure (TMAP) sensor 17E in signal communication with the controller 25E configured to measure the temperature and absolute pressure of the air flow into the intake manifold 20E. The system 10E also includes an (RPM) sensor 19E in signal communication with the controller 25E configured to measure the speed of the engine 12E in revolutions per minute (RPM). The system 10E also includes an exhaust gas oxygen (EGO) sensor 21E in signal communication with the controller 25E configured to measure the oxygen content of the exhaust gas exiting the conduit 62E. As with the previous embodiments, air flow, EGR flow and hydrogen fuel flow to the engine 12E are controlled to control engine torque, minimize throttling work and provide a mixture that includes the hydrogen fuel, the ambient air and the exhaust gas in a stoichiometric fuel/air ratio. The sensors also provide the data necessary for calculating the EGR percentage, which may be further used for other engine control functions, such as ignition timing.

Figure 7:
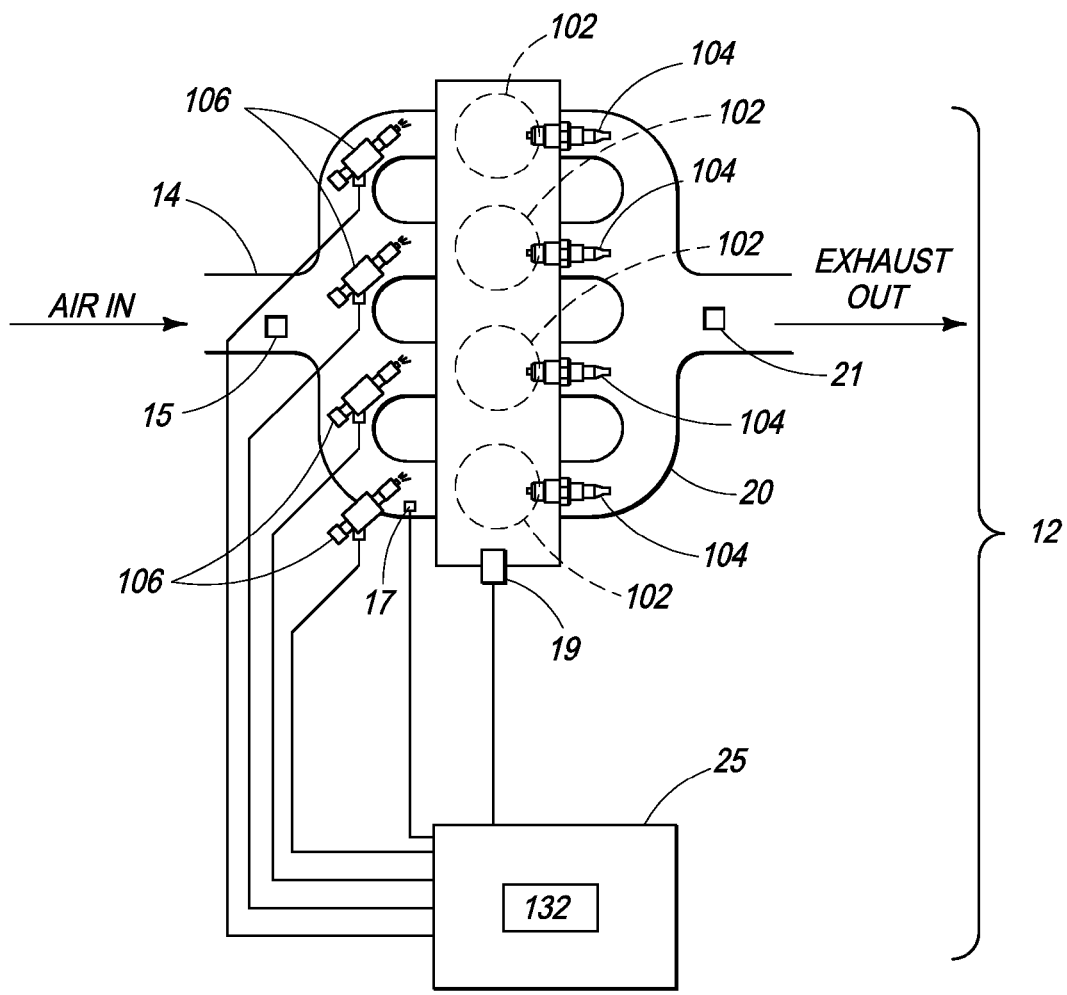
FIG. 7 is a schematic diagram of an internal combustion engine for the systems of FIGS. 1 through 5.

Referring to FIG. 7, an engine 12 which is generic to each of the previous embodiments (12A-12E), is illustrated in further detail. The engine 12 includes an intake manifold 14 and an exhaust manifold 20. The engine 12 also includes one or more cylinders 102, and a spark plug 104 in each cylinder 102. Each cylinder 102 also includes a fuel injector 106 configured to provide hydrogen fuel to the cylinder 102. The hydrogen fuel is injected into the air flow into the intake manifold 14 at the entrance to each cylinder 102. This practice is known as "port injection".

The engine 12 also includes an engine controller 25 configured to regulate the flow of hydrogen fuel into the fuel injectors 106. The engine controller 25 can include a processor (CPU), input/output ports, and electronic storage components, such as read only memories (ROM) and random access memories (RAM) containing processor executable instructions and calibration values. The engine controller 25 receives signals from one or more MAF sensors 15, TMAP sensors 17, RPM sensors 19 and exhaust gas oxygen sensors 21. Additional sensors can be used to provide additional engine operating conditions and data to the engine controller 25. The engine controller 25 is also in signal communication with and controls the timing of the spark plugs 104. In addition, the engine controller 25 controls the hydrogen fuel supplied by the fuel injectors 106 to the cylinders 102, and the air & EGR flow supplied by the air & EGR flow control valves 18C-18E (FIGS. 3-5) to the cylinders 102.

In addition to being in flow communication with the fuel injectors 106 and the air & EGR flow control valves 18C-18E (FIGS. 3-5) via the intake manifold 14, the cylinders 102 are also in flow communication with the exhaust manifold 20. The exhaust manifold 20 includes an exhaust gas oxygen sensor 21 configured to measure the oxygen content of the exhaust gas exiting the cylinders 102.

In order to regulate the delivery of the hydrogen fuel to the fuel injectors 106 and to the cylinders 102, the engine controller 25 can initially determine a required airflow into the engine 12. The corresponding stoichiometric amount of hydrogen fuel can then be determined. One method for performing these determinations uses the engine speed in revolutions per minute (RPM), the intake manifold absolute pressure (MAP), and the intake manifold temperature (MAT), to calculate a total intake flow (TIF). The total intake flow (TIF) is theoretically proportional to a volumetric efficiency correction factor (VE) times (MAP) times (RPM/MAT). The total intake flow can be determined by the formula TIF=(MAF+FUEL+EGR)=K*MAP*RPM*VE/MAT (where K is a proportionality constant including engine displacement and unit conversions). The values for MAP, RPM and MAT are provided by the sensors 17, 19, 21.

Still referring to FIG. 7, the engine controller 25 can also include, or be in signal communication with, a look up table 132. Any real-world deviation from constant proportionality, known as the 'volumetric efficiency', can be characterized in the look-up table 132. This method, called the 'speed-density' airflow measurement technique, calculates the total intake air+fuel+EGR flow, but does not provide any information about the air-only flow, specifically, which is needed for the corresponding stoichiometric hydrogen calculation.

Figure 8:
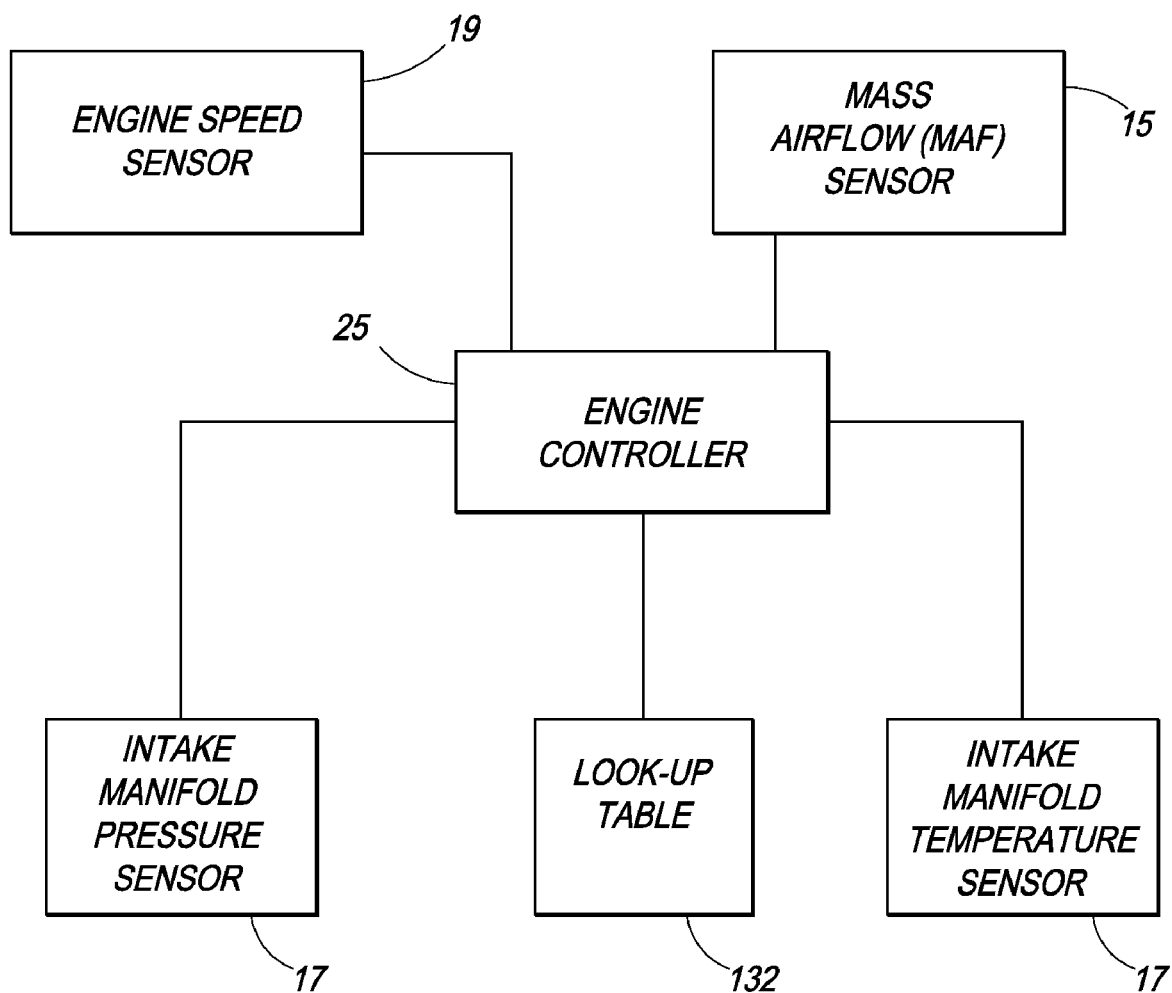
FIG. 8 is a schematic diagram of an engine controller and sensors for sensing data in the systems of FIGS. 1 through 5.

Another method of intake flow measurement, illustrated in FIG. 8, uses a mass airflow (MAF) sensor 15 in electrical communication with the engine controller 25. The MAF sensor 15 can comprise an electrically heated wire or film, which is cooled by the incoming air. This technique is also known as hot-wire anemometry. The electrical power required to maintain a constant high temperature (about 90° C. to 150° C.) in the MAF sensor 15 is directly related to the mass airflow (MAF). To maintain the MAF sensor 15 at a constant temperature, a feedback circuit can be used.

Figure 10:
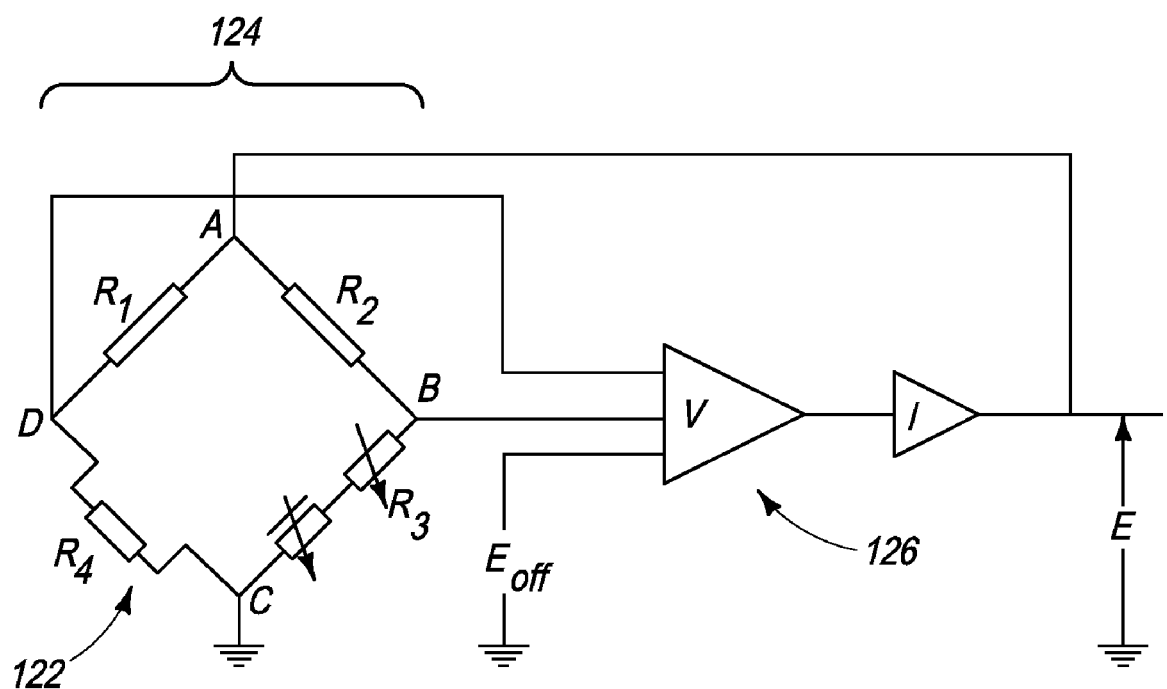
FIG. 10 is a schematic diagram of a hot-wire anemometer.

An exemplary feedback circuit in the form of a Wheatstone bridge 124 is shown in FIG. 10. The Wheatstone bridge 124 can include a hot wire 122 and a voltmeter 126. The Wheatstone bridge 124 can be configured such that the wire resistance of the hot wire 122 is kept constant over the bandwidth of the feedback loop. The electrical power input to the MAF sensor 15 (FIG. 8) is then related to the voltage across the MAF sensor 15 (FIG. 8), and this voltage provides a measure of the mass flow. Since the hot wire voltage is a potential division of the output voltage, the output voltage is normally measured for convenience. Once the output voltage is known, the engine controller 25 (FIG. 8) can compute the flow of air past the MAF sensor 15 (FIG. 8).

While MAF sensors 15 (FIG. 8) are appropriate and accurate for ambient air measurement, there are some drawbacks to using them for flow measurements that include EGR. EGR has the potential for variable composition and therefore variable thermal characteristics due to fuel/air ratio changes and variable exhaust water content. Any changes in thermal characteristics will cause changes in the MAF measurement. In addition, corrosive condensation entrained as droplets can damage the fragile hot wire 122, and unburned hydrogen and oxygen can ignite on the hot wire 122, which is commonly made from catalytic materials.

Speed-density is a robust method for determining the total air+fuel+EGR engine intake flow. The air-only flow can then be measured using the MAF sensor (e.g., 15C—FIG. 3) upstream of the air & EGR flow control valve (e.g., 18C—FIG. 3) and inside the ambient air conduit (e.g., 38C—FIG. 3). As ambient air flows into the air & EGR flow control valve (e.g., 18C—FIG. 3), it will pass through the MAF sensor (e.g., 15C—FIG. 3), giving the engine controller 25 a measurement of the air flow. The difference between the value calculated by the speed density method, which is the total amount of air+fuel+EGR provided to the engine 12, and the MAF sensor (e.g., 15C—FIG. 3), plus the stoichiometric fuel flow calculated from MAF, which is the ambient air+fuel flow, provides the EGR flow. The MAF sensor (e.g., 15C—FIG. 3) provides the information necessary to calculate the hydrogen fuel requirements to maintain a stoichiometric fuel/air mixture. The final determination of actual fuel/air ratio can be provided by direct exhaust oxygen measurement using the oxygen exhaust sensor 21 (FIG. 7). Either narrowband or wideband oxygen exhaust sensors can be used for fuel control feedback and fine-tuning. The independent knowledge of airflow and EGR flow, along with other sensor data, can be used to calculate an appropriate parameter, to be used as one dimension in the spark ignition timing calibration table. This parameter can also be used for many other electronic engine control tables and functions.

The airflow and air/EGR ratio measurements outlined above are not the only possibilities, but are given as preferred methods for robust engine control. Other flow measurement techniques, such as differential pressure and valve position, or other EGR dilution measurement methods, such as intake manifold oxygen sensing, can also be used, but may not be as accurate, robust, and/or safe in the present application.

Figure 9:
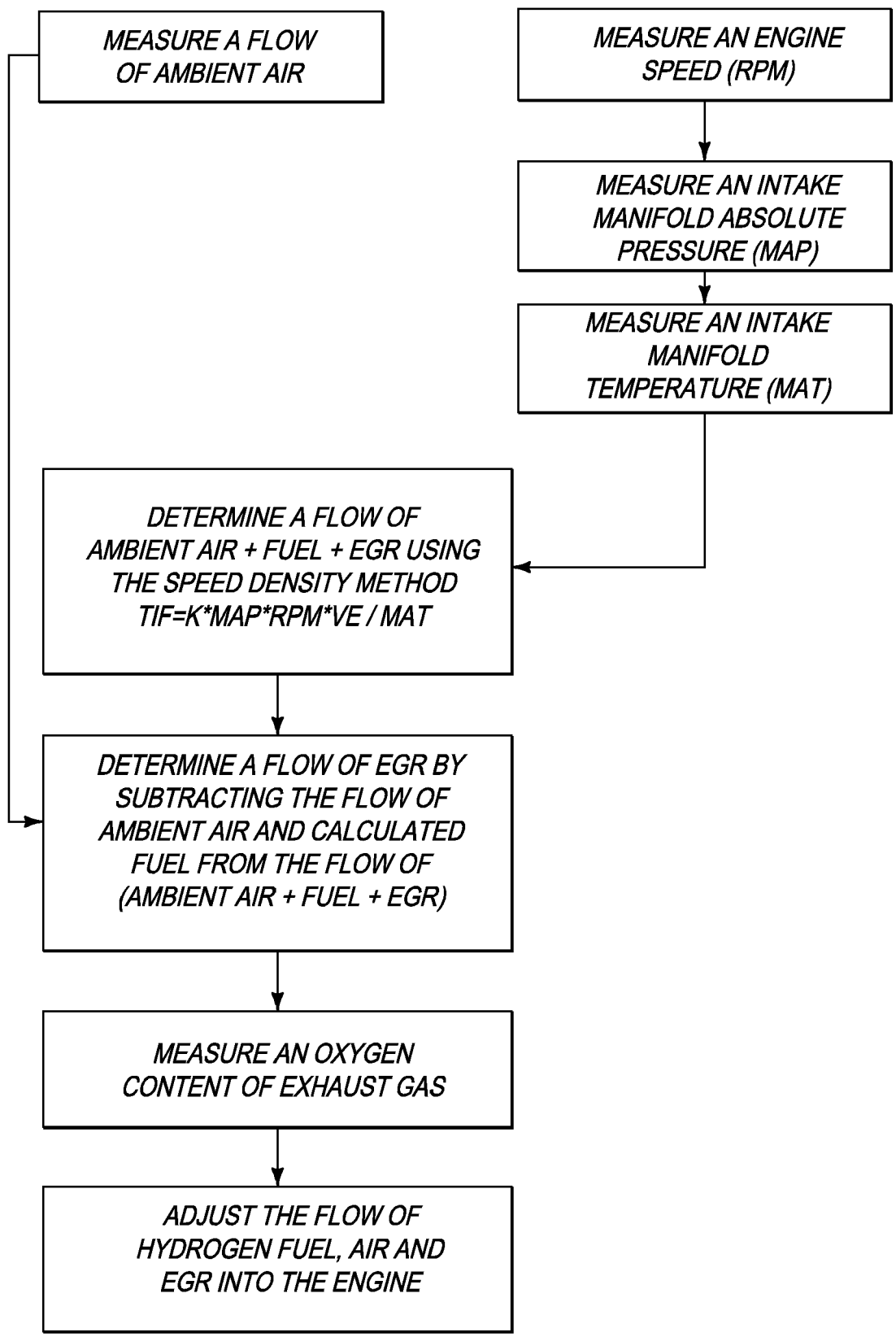
FIG. 9 is a flow chart of a method for determining a stoichiometric fuel/air ratio from engine operating data.

FIG. 9 summarizes the steps in the above outlined methods for controlling the stoichiometric fuel/air ratio and EGR flow based on engine operating data.

Figure 11:
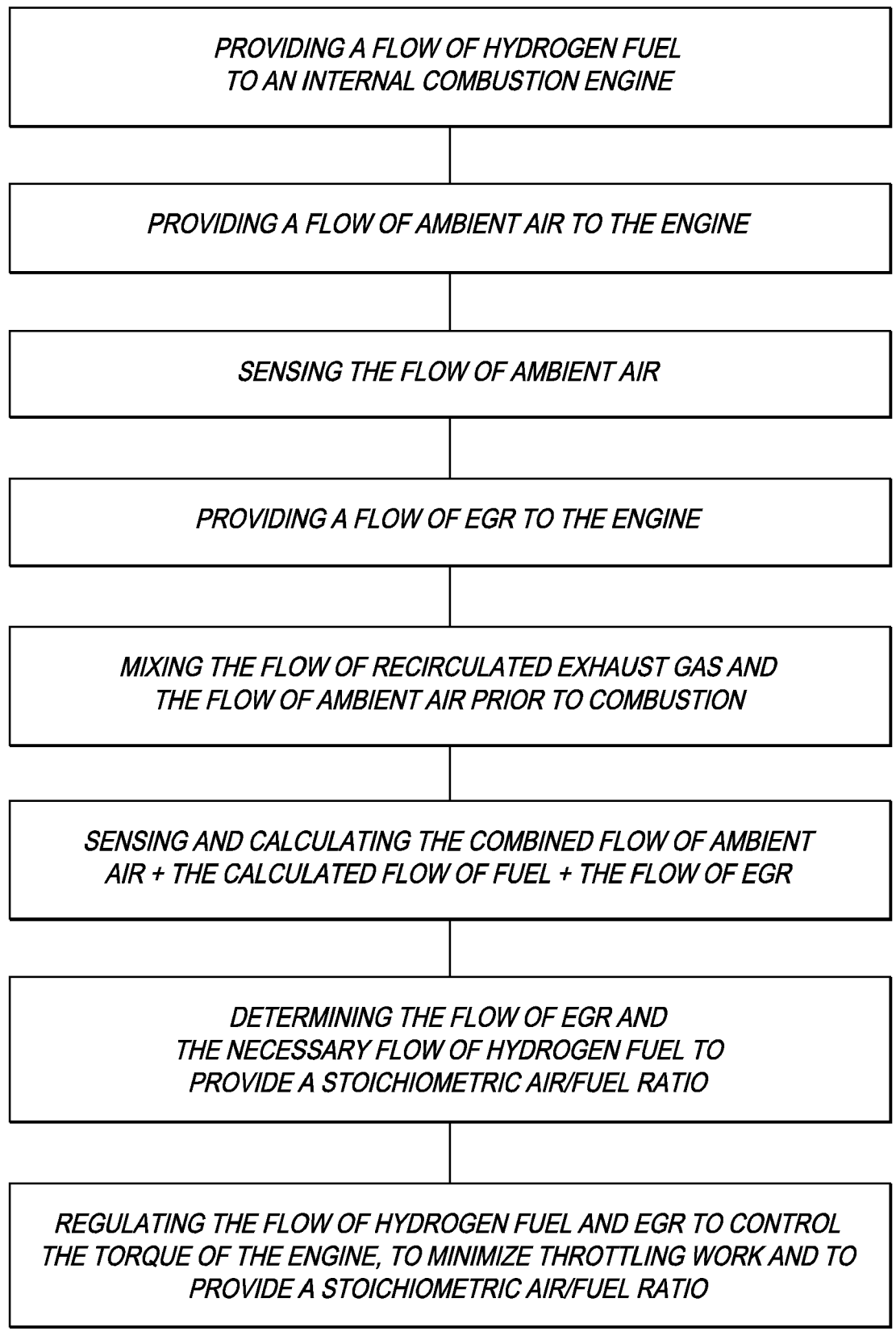
FIG. 11 is a flow chart of a method for operating a hydrogen fueled internal combustion engine.

The method for operating a hydrogen powered internal combustion engine is illustrated in FIG. 11. The method includes the step of providing a flow of gaseous hydrogen fuel to the internal combustion engine, and the step of providing a flow of ambient air to the engine. The method also includes the step of sensing the flow of ambient air flow to the engine. The method also includes the steps of providing a flow of recirculated exhaust gas (EGR) to the engine, and mixing the flow of recirculated exhaust gas (EGR) and the flow of ambient air prior to combustion. The method also includes the steps of sensing and calculating a combined flow of ambient air, fuel, and EGR, determining a flow of EGR, determining the necessary flow of hydrogen fuel to provide a stoichiometric fuel/air ratio, and regulating the flow of hydrogen fuel and EGR to control the torque of the engine, minimize throttling work and provide a stoichiometric fuel/air ratio. As previously outlined, the EGR flow can be determined by subtracting the flow of ambient air and calculated fuel from the total intake flow of ambient air+fuel+EGR. In addition, the calculation of the total flow of ambient air+fuel+EGR can be achieved using the 'speed-density' method as described above.

In addition to regulating the flow of hydrogen fuel necessary to create stoichiometric fuel/air ratios, the method can also include the steps of determining the necessary stoichiometric ratios of hydrogen fuel, ambient air flow and recirculated exhaust gas, and adjusting the flows of all three gases accordingly (and throttling if necessary) to control engine torque and achieve a stoichiometric fuel/air ratio and stable combustion.

To achieve a stoichiometric exhaust gas containing zero oxygen, the method can further include the steps of measuring the amount of oxygen present in the exhaust gas produced by the internal combustion engine, adjusting the fuel/air ratio, and regulating the flow of ambient air, hydrogen fuel and EGR to produced a zero oxygen exhaust.

Additionally, the method can include the step of providing the exhaust gas produced by the engine to a three-way catalyst configured to remove emissions from the exhaust gas, such as NOx, as well as carbon monoxide and hydrocarbon emissions from lubrication oil consumption.

Thus the invention provides an improved system and method for operating a hydrogen powered internal combustion engine. While the invention has been described with reference to certain preferred embodiments, as will be apparent to those skilled in the art, certain changes and modifications can be made without departing from the scope of the invention as defined by the following claims.

What is claimed is:

1. A system comprising:
a hydrogen fueled internal combustion engine;
a fuel system configured to provide a flow of hydrogen fuel and a flow ambient air to the engine;
an EGR system configured to provide a flow of recirculated gas to the engine which includes exhaust gas from the engine; and
a controller configured to regulate the flow of hydrogen fuel, the flow of ambient air and the flow of the recirculated gas to the engine to control torque, to minimize throttling work and to provide a mixture comprised of the hydrogen fuel, the ambient air and the recirculated gas in a stoichiometric fuel/air ratio.

2. The system of claim 1 wherein the EGR system comprises an internal system wherein the exhaust gas is either trapped or drawn back into the engine.

3. The system of claim 1 wherein the EGR system comprises an external system comprising an air & EGR flow control valve configured to control the flow of ambient air and the flow of recirculated gas to the engine.

4. The system of claim 1 further comprising a three way exhaust catalyst configured to remove one or more emission gases from the exhaust gas.

5. The system of claim 1 further comprising a turbocharger configured to turbocharge the flow of ambient air and the flow of recirculated gas to the engine.

6. The system of claim 1 further comprising a supercharger configured to pressurize the flow of ambient air and the flow of recirculated gas to the engine.

7. The system of claim 1 further comprising a plurality of sensors configured to provide data on various parameters to the controller.

8. A method of operating a hydrogen powered internal combustion engine comprising:
providing flows of hydrogen fuel, air and recirculated exhaust gas to the engine;
operating the engine with a mixture comprised of the hydrogen fuel, the air and the recirculated exhaust gas;
determining the flows of the hydrogen fuel, the air and the recirculated exhaust gas necessary to provide a stoichiometric fuel/air ratio of the mixture during the operating step; and
regulating the flows during the operating step to reduce throttling and control torque at engine loads and corresponding air/EGR ratios above a predetermined amount.

9. The method of claim 8 further comprising throttling the engine at the engine loads and the corresponding air/EGR ratios below the predetermined amount to maintain stable, efficient combustion.

10. The method of claim 8 further comprising burning substantially all of the air and the hydrogen fuel in the mixture during the operating step.

11. The method of claim 8 wherein the predetermined amount is approximately 10% hydrogen by volume in stoichiometric air plus recirculated exhaust gas at a total pressure reduced by throttling.

12. A method of operating a hydrogen powered internal combustion engine comprising:
providing a fuel system configured to provide a flow of hydrogen fuel and a flow of ambient air to the engine;
providing an EGR system configured to provide a flow of recirculated gas which includes exhaust gas from the engine;
providing a controller configured to operate the fuel system, and the EGR system;
providing at least one sensor configured to provide data to the controller; and
operating the fuel system, the EGR system, the controller and the sensor to control a torque of the engine, to reduce throttling, and to provide a mixture to the engine comprising the hydrogen fuel, the ambient air and the recirculated gas in a stoichiometric fuel/air ratio.

13. The method of claim 12 wherein the EGR system comprises an internal system wherein the exhaust gas is either trapped or drawn back into the engine.

14. The method of claim 12 wherein the EGR system comprises an external system comprising an air & EGR flow control valve configured to control the flow of ambient air and the flow of recirculated gas to the engine.

15. The method of claim 12 further comprising removing at least one emission gas from the exhaust gas.

16. The method of claim 12 further comprising turbocharging the flow of ambient air and the flow of recirculated gas to the engine.

17. The method of claim 12 further comprising supercharging the flow of ambient air and the flow of recirculated gas to the engine.

18. The method of claim 12 further comprising removing water vapor from the flow of ambient air and the flow of recirculated gas to the engine.

19. The method of claim 12 further comprising cooling the flow of ambient air and the flow of recirculated gas to the engine.

20. The method of claim 12 further comprising cooling and removing water vapor from the flow of ambient air and the flow of recirculated gas to the engine.

* * * * *